United States Patent
Frommann et al.

Patent Number: 6,103,110
Date of Patent: Aug. 15, 2000

[54] SCREENING APPARATUS FOR SEWAGE

[75] Inventors: Christian Frommann, Deining; Thomas Schreiber, Freystadt, both of Germany

[73] Assignee: Hans Huber GmbH Maschinen- und Anlagenbau, Berching, Germany

[21] Appl. No.: 09/167,116

[22] Filed: Oct. 6, 1998

[30] Foreign Application Priority Data

Oct. 9, 1997 [DE] Germany .............. 197 44 524

[51] Int. Cl.$^7$ .................. E02B 5/08; C02F 1/40
[52] U.S. Cl. .............. 210/159; 210/162; 210/397; 210/402; 198/670
[58] Field of Search .................. 210/154, 162, 210/163, 155, 170, 159, 348, 358, 396, 397, 402; 198/670, 671

[56] References Cited

U.S. PATENT DOCUMENTS

| | | | |
|---|---|---|---|
| 2,483,200 | 9/1949 | Haug | 210/396 |
| 4,859,322 | 8/1989 | Huber | 210/162 |
| 5,006,236 | 4/1991 | Croket | 210/162 |
| 5,507,947 | 4/1996 | Kriegl | 210/402 |
| 5,552,044 | 9/1996 | Abel | 210/155 |
| 5,770,094 | 6/1998 | Garton et al. | 210/162 |
| 5,798,038 | 8/1998 | Huber | 210/154 |
| 5,840,180 | 11/1998 | Filion | 210/155 |

FOREIGN PATENT DOCUMENTS

| | | |
|---|---|---|
| 0594167 | 10/1993 | European Pat. Off. . |
| 105189 | 4/1974 | Germany . |
| 3941673 | 6/1991 | Germany . |
| 4138825C2 | 2/1994 | Germany . |
| 4412679C2 | 3/1997 | Germany . |
| 295 11 462 U | 4/1998 | Germany . |

*Primary Examiner*—David A. Simmons
*Assistant Examiner*—Frank M. Lawrence
*Attorney, Agent, or Firm*—Womble Carlyle Sandridge & Rice

[57] ABSTRACT

A screening apparatus (1) for sewage (13) including liquid (4) and debris and flowing in an oncoming tube (23) includes a conveyor assembly (6) and a separation area (2). The conveyor assembly (6) has a tube-like housing (7), an axle (8) driven by a motor, and a screw (9) provided on the axle (8). The conveyor assembly (6) with its axis (10) is arranged substantially vertical to convey the debris in a substantially upward direction. The separation area (2) of cylindrical shape to deposit the debris has an axis (5), an inner surface (41), a circumference, and openings (3) located about the circumference. The separation area (2) with its axis (5) is arranged in alignment with the substantially vertically arranged axis (10) of the conveyor assembly (6). The separation area (2) is connected to the housing (7) of the conveyor assembly (6), and includes an opening (17) serving as an inlet (40) for the sewage (13) into the interior of the separation area (2).

16 Claims, 4 Drawing Sheets

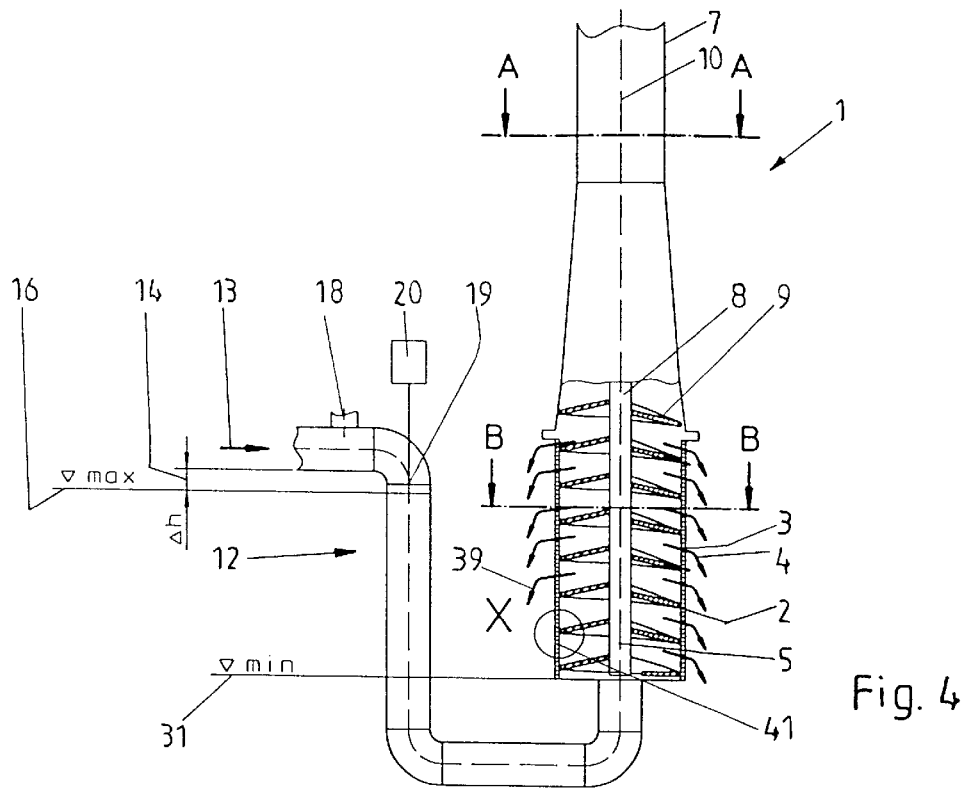
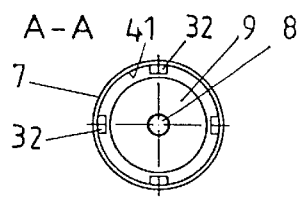
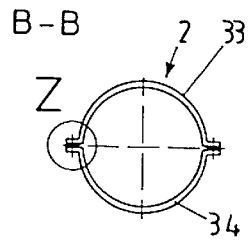
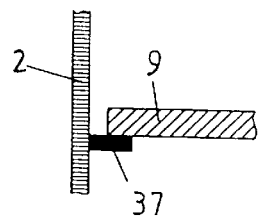
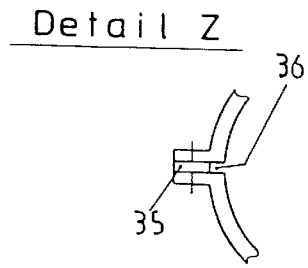

SCREENING APPARATUS FOR SEWAGE

FIELD OF THE INVENTION

The present invention generally relates to a screening apparatus for sewage. More specifically, the present invention relates to a screening apparatus for sewage including liquid and floating and suspended debris flowing in an oncoming tube. The screening apparatus generally includes a separation area to deposit debris and a conveyor assembly to convey the debris.

BACKGROUND OF THE INVENTION

The invention may be applied in buildings being provided to collect sewage but it can be also applied in other circumstances, for example in pits or in channels. The screening apparatus can be used overground, especially in case of the screening apparatus being included in a container. Buildings provided to collect sewage serve to store the sewage and to deliver the sewage with natural hydraulic gradient to the clarification plant. The liquid is lifted with a pump having a downstream conduit. The pump is arranged in a pump sump of the building. In such buildings, there often is little room to position the screening apparatus. The buildings in form of a pit have a certain depth and a small bottom area. In all of these cases, it is necessary to sieve the liquid containing floating and suspended debris, i.e. to set and to remove the debris so not to destroy the pump.

A screening apparatus is known from German Patent No. 44 12 679 C2. The separation area is fixedly connected to the oncoming tube and has a configuration of a housing. The screening apparatus is provided with a conveyor assembly to convey the debris upwardly. The conveyor assembly has a tube-like housing and a driven screw arranged therein. The conveyor assembly has a first horizontally arranged conveying section and a second vertically arranged conveying section. The sewage is sieved at the same time. The deposited debris is removed from the building. This combined sieving and conveying apparatus is fixedly arranged and connected to the oncoming tube, so that the liquid has to flow through the separating area. The separating area is cleaned over and over again by the revolving screw. Thus, there is no danger of debris loading or clogging the separation area. Consequently, the separation area can always fulfill its function. If the amount of debris to deposit increases more debris is deposited on the inner surface of the separation area, and more debris is conveyed upwardly out of the building. There are no periods in which the non-cleaned liquid can enter the pump. The separation area is part of the tube-like housing of the conveyor assembly. The conveyor assembly has a first horizontally arranged conveying section. The separation area is located in the first conveying section where the sieving takes place. The second vertically arranged conveying section serves to remove the deposited debris out of the building. The second conveying section can end in a discharge bend or a chute guiding the debris into a container. Arranging both of the conveying sections perpendicular to each other requires a great amount of room. The screw of the conveyor assembly can be driven continuously or discontinuously. It is possible to provide timely equal intervals to attain a certain partly loading or clogging of the separation area, and thus to use an increased filter effect. Nevertheless, there is the need of cleaning the separation area from time to time to prevent a complete loading or clogging of the separation area.

SUMMARY OF THE INVENTION

Briefly described, the present invention comprises a screening apparatus for sewage including liquid and debris and flowing in an oncoming tube. The screening apparatus includes a conveyor assembly having a tube-like housing, an axle driven by a motor, and a screw provided on the axle. The conveyor assembly with its axis is arranged substantially vertical to convey the debris in a substantially upward direction. The screening apparatus further includes a separation area of cylindrical shape to deposit the debris. The separation area has an axis, an inner surface, a circumference, and openings located about the circumference. The separation area with its axis is arranged in alignment with the substantially vertically arranged axis of the conveyor assembly. The separation area is connected to the housing of the conveyor assembly, and the separation area includes an opening serving as an inlet for the sewage into the interior of the separation area.

The present invention starts from the idea not to position the separation area perpendicular to the conveyor assembly. Instead, the separation area and the conveyor assembly are vertically arranged and their axes are located in alignment one above the other. Thus, an apparatus results which needs little room to be installed, even in a pit. The structural unit only needs one drive, especially one motor to be positioned on top of the conveyor assembly. In addition, the conveyor assembly and the screening apparatus are incorporated so that the separation area is cleaned by the screw of the conveyor assembly extending in a substantially downward direction and into the interior of the separation area. The deposited debris is removed and conveyed in a substantially upward direction. The separation area with a cylindrical configuration has to be provided with an opening located in the lower region of the separation area. Through this opening, the sewage enters the interior of the separation area. The screening apparatus should be positioned in a manner so that the opening is overflown from time to time. The column of liquid makes the sewage flow into the screening apparatus, so that the debris deposits on the separation area. The debris is taken off by the screw of the conveyor assembly, and is subsequently removed upwardly. Due to the situation in which the apparatus is positioned, the complete overflow of the opening can be attained. For example, the natural hydraulic gradient of the oncoming tube is used, or a special controlling of the screening apparatus is performed.

The axle and the screw of the conveyor assembly may extend completely or partly along the inner chamber of the separation area. It is possible to use a screw in this region having no axle or to use an axle ending further above than the screw. The construction is to be designed with respect to the needed overflow of the opening in the screening area.

A charger may be arranged upstream of the opening of the separation area. The charger is designed and arranged to generate a height difference between the oncoming tube and a maximum level in the charger, and to provide a free outlet of the liquid through the separation area. The sewage to be sieved is fed into the screening apparatus via this charger. The charger has two functions. It generates a height difference and prevents banking-up of the sewage in the oncoming tube, i.e. the sewage can enter the charger without banking-up. A height difference is to be understood as a difference between the bottom of the oncoming tube and the predetermined maximum level of the liquid in the charger. The charger can be provided with a sensor to watch the liquid level. This sensor controls the motor driving the conveyor assembly. As soon as the liquid level reaches the height of the sensor, the motor is actuated. During periods in which the motor is not actuated, a depositing of debris on the separation area occurs. Consequently, the separation area is loaded or clogged partly more and more, and the liquid level rises. Then, the motor is actuated and cleaning of the separation area takes place. The liquid can flow through the openings of the separation area which makes the liquid level fall. The falling of the liquid level can be taken as a signal to stop the motor and the procedure starts again. The charger has another function. The charger must be designed and arranged so that it leads the sewage to be sieved into the interior of the unit composed of the separation area and the conveyor assembly by a U-shaped connection through the opening without additional pressure, so that the liquid can penetrate through the openings in the separation area, and can be collected in a pump sump or a container, respectively, using the natural hydraulic gradient. The charger is designed open, i.e. above the maximum level of the liquid. The charger has a connection to the atmosphere, so that it is the atmospheric pressure that makes the sewage flow into the interior of the screening apparatus. The charger can have the form of a housing or of a tube having sections and quarter bends.

The screw may be provided with a brush or a stick on its radial outside. The brush or stick is arranged on the outer circumference of the screw, and contacts the inner surface of the separation area during rotation, so that the deposited debris is taken off, and the separation area is cleaned over and over again. Brushes or sticks of this kind can be easily replaced if wear makes it necessary.

As far as the connection between the charger and the interior of the separation area of the unit is concerned, there are a number of different possibilities. In a first embodiment, the charger is radially connected to the cylindrical separation area. The advantage of this embodiment is that the maximum conveying height of the unit is equal to its construction height, so that the maximum height can be used. Thus, it is possible to remove debris even from oncoming tubes which are arranged rather deep with respect to the bottom of a pit. It is the disadvantage of this embodiment that one part of the separation area cannot be used for sieving purposes because of this part of the separation area being needed to provide the opening.

On the other hand, it is also possible to axially connect the charger to the cylindrical separation area. The advantage of this embodiment is that the entire circumference of the separation area is use for sieving purposes. The lower front surface of the cylindrical separation area is the place to form the opening for the connection with the charger. This embodiment wastes a little height. But this disadvantage may be accepted since a U-like connection is needed anyway. In addition, the advantage of the entire circumference of the separation area being equally used for penetration of liquid. The path of the liquid is symmetrical to the axis of the screening apparatus. Thus, the same amount of debris deposits on each portion or section of the separation area.

The charger may include an emergency outlet connected to the atmosphere. This emergency outlet also serves as a connection of the charger to the atmosphere. On the other hand, the emergency outlet is used in emergency conditions, for example in case of power failure of the motor to drive the conveyor assembly, and subsequent loading or clogging of the separation area by depositing debris. Then, the non-cleaned sewage can flow to the pump sump, and banking-up of the sewage in the oncoming tube is prevented.

A conical housing may be arranged between the separation area and the housing of the conveyor assembly. The screw of the conveyor assembly also extends along this region. The upwardly conveyed debris is compressed for a first time. The conveyor assembly may be also provided with a special pressing zone which is arranged adjacent to the outlet of the debris. The pressing zone may have an abutment for the compression of the conveyed debris. It is useful to position openings in the pressing zone also for penetration of liquid through the housing of the conveyor assembly.

The screw of the conveyor assembly may be radially arranged in downwardly inclined relation with respect to the axle. This arrangement enhances the contact of the debris with the inner wall of the housing of the conveyor assembly. A better conveying effect results from this embodiment.

The separation area may include two shells and conveyor bars arranged between the two shells and spaced apart from the inner surface of the separation area. For example, the ends of the shells are connected to each other by flanges and a screw connection. Sticks may be provided at the connection points to form "negative" conveyor bars, i.e. grooves or recesses in form of clearance zones or free spaces into which debris can enter without rotating. This arrangement has a positive influence on conveying the debris in an upward direction.

The housing of the conveyor assembly may include "positive" conveying bars. These "positive" conveying bars are bars that are arranged on the inner surface of the housing of the conveyor assembly. The outer edge of the screw passes the conveying bars with a little distance. These "positive" conveying bars prevent a useless revolution of the debris together with the screw without any conveying effect.

The axle of the conveyor assembly may be a tube. It is useful if the axle of the conveyor assembly extends along the separation area. The lower end of the axle may be guided in a bearing positioned at this place. This feature is useful if the charger is connected to the interior of the separation area in radial relation.

A container may be provided substantially surrounding essential parts of the screening apparatus and serving to collect the liquid flowing through the openings of the separation area. A screening apparatus like this is used in overground connection and requires little space. The liquid is removed out of the container. The charger is also arranged in the container.

It is an object of the present invention is to provide a screening apparatus having little dimensions.

Another object of the present invention to provide a screening apparatus in which the sewage can be sieved and the debris can be removed even in buildings having little room.

Still another object of the present invention is to provide a screening apparatus that does not require a separate structural element to remove the debris from the separation area.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views. The drawings schematically represent apparatuses according to preferred embodiments of the present invention.

FIG. 4 illustrates another embodiment of the screening apparatus.

FIG. 5 shows a cross section along line A—A of FIG. 4.

FIG. 6 shows a cross section along line B—B of FIG. 4.

FIG. 7 illustrates a detail Z of FIG. 6.

FIG. 8 illustrates a detail X.

DETAILED DESCRIPTION

Figure 1:
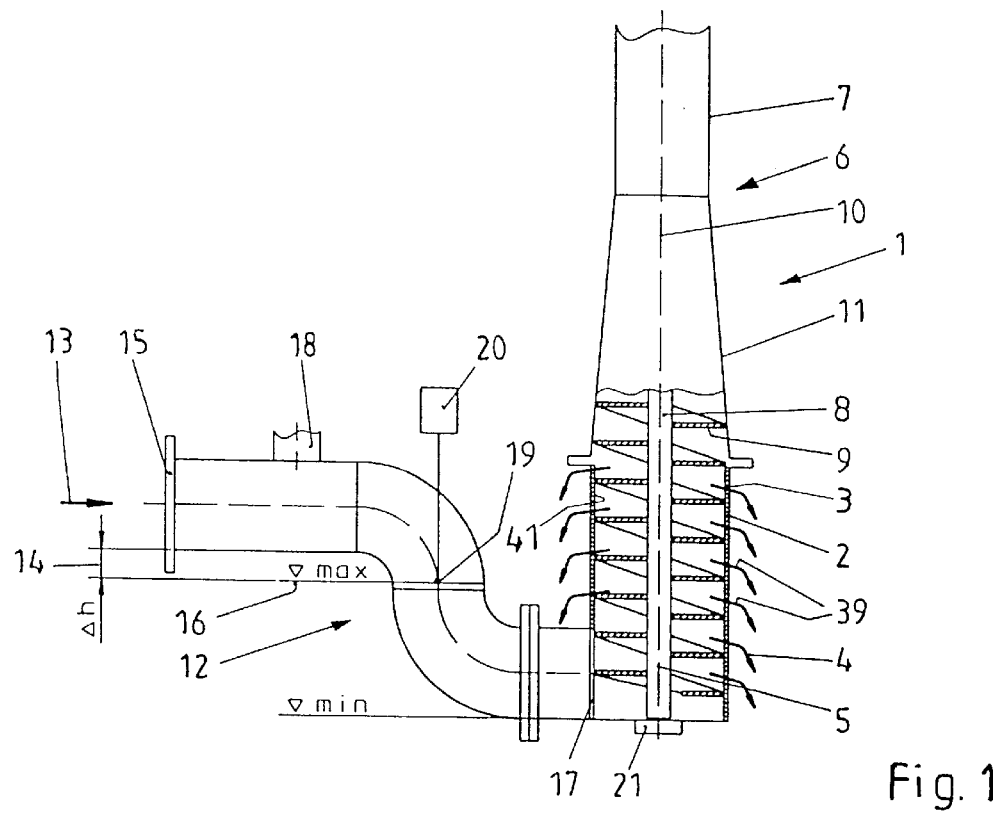
FIG. 1 is a side elevational view of a first embodiment of the invention.

Referring now in greater detail to the drawings in which like reference numerals indicate like parts throughout the several views, FIG. 1 illustrates a first embodiment of the screening apparatus 1. A separation area 2 has a cylindrical shape and openings 3 are located in the separation area 2 through which the liquid 4 can flow in the direction of arrows 39. The openings 3 can be located on the entire circumference of the separation area 2, or alternatively only on one part of the circumference. The openings 3 may be equally or unequally spaced apart from each other. The separation area 2 with its axis 5 is vertically positioned. The separation area 2 has an inner surface 41 on which the debris from the sewage deposits. A conveyor assembly 6 having a housing 7, an axle 8, and a screw 9 is positioned with respect to and above the separation area 2. The conveyor assembly 6 has an axis 10 which is arranged vertically and in alignment with the axis 5 of the separation area 2. The axle 8 has the screw 9 extending upwardly to a discharge point (not shown). A motor is provided on top of the housing 7 to drive the axle 8. The axle 8 having the screw 9 extends along the vertical height of the separation area 2 to contact the inner surface of the separation area 2. Between the separation area 2 and the housing 7, a conical housing 11 may be provided and the screw 9 also tapers in this area.

Figure 2:
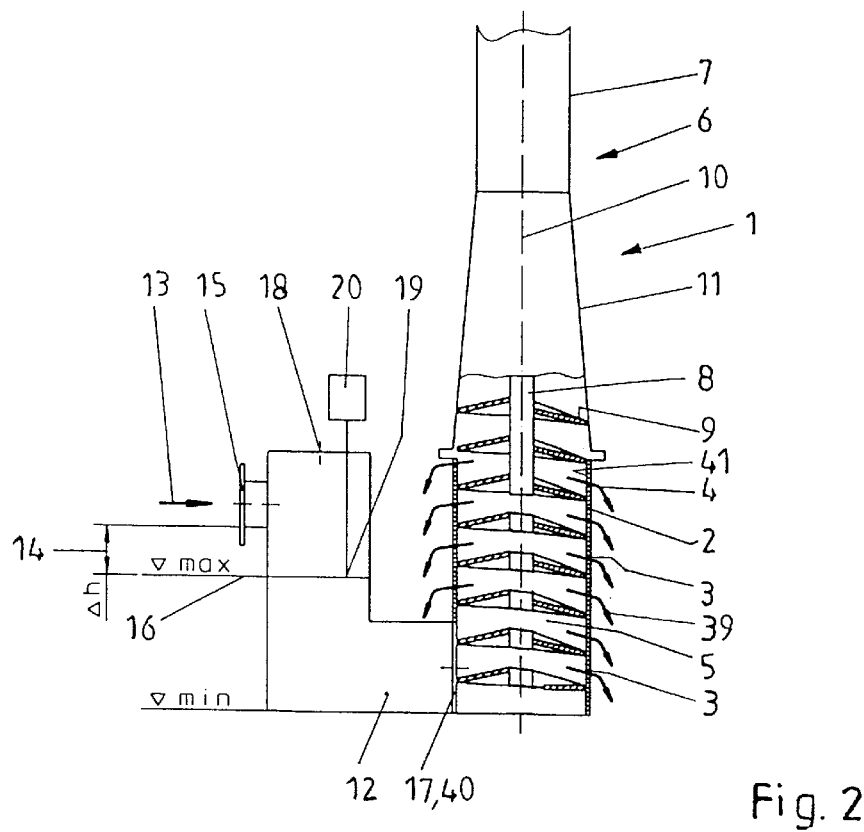
FIG. 2 is a side elevational view of a second embodiment of the invention.

The screening apparatus 1 includes a charger 12 which is an important component of the screening apparatus 1. The charger 12 is positioned with respect to a chamber defined by the inner surface 41 of the separation area 2. One purpose of the charger 12 is to direct sewage 13, flowing in an oncoming tube and containing debris, to the separation area 2 of the screening apparatus 1. The charger 12 can have a tube-like configuration (FIG. 1) or a container-like shape (FIG. 2). The charger 12 generates a height difference 14 defined as the difference between the lowest point of the oncoming tube (not shown in FIG. 1) or a flange 15 of the charger 12, respectively, and a predetermined maximum level 16 of the sewage in the charger 12. The height difference 14 prevents banking-up of the sewage in the oncoming tube, i.e. the sewage 13 can enter the charger 12 without banking-up. The charger 12 including tube sections and quarter bends is radially connected to the lower portion of the separation area 2. For this purpose, the separation area 2 is provided with an opening 17 forming an inlet 40. The usable area of the separation area 2 is reduced by the opening 17. The interior of the charger 12 is connected to the interior of the screening apparatus 1 in U-like configuration, so that the sewage 13 of the charger 12 enters the interior of the screening apparatus 1. The charger 12 has an emergency outlet 18 connected to the atmosphere. In case of power failure of the motor driving the conveyor assembly 6 and subsequent loading of the separation area 2 by depositing debris, the emergency outlet 18 also serves to guide the non-screened sewage 13 in a direction away from the oncoming tube. Thus, the sewage 13 bypasses the screening apparatus 1.

The maximum level 16 of the liquid 4 is surveyed with a sensor 19 of a control apparatus 20 which controls the motor of the conveyor assembly 6. As soon as the liquid rises to the maximum level 16 in the charger 12 due to loading of the separation area 2 by depositing debris, the conveyor assembly 6 is actuated and the revolving screw 9 takes off the deposited debris. Thus, the separation area 2 is cleaned, so that liquid 4 can pass through the openings 3 to a greater extent, again. As soon as the liquid level falls, the motor driving the conveyor assembly 6 is turned off. Furthermore, it is possible to run the motor for a predetermined period of time.

The axles 8 and the screw 9 of the conveyor assembly 6 extend downwardly to the bottom, and thus along the interior defined by the inner surface 41 of the separation area 2. A bearing 21 to hold the axle 8 is arranged at the lower end of the separation area 2.

The structure of the embodiment of the screening apparatus 1 illustrated in FIG. 2 is generally the same as the embodiment of FIG. 1. The charger 12 has the configuration of a housing. The screw 9 is connected to the axle 8 in a special way, i.e. inclined downwardly in a radial direction, to increase the contact of the screened material with the inner surface 41 of the separation area 2, the conical housing 11, and the housing 7 of the conveyor assembly 6. Thus, the conveying effect is improved. In FIGS. 1 and 2, it can be seen that the highest point of the separation area 2 is above the maximum level 16. Thus, during normal use, the separation area 2 is only used in a lower portion of the separation area 2. The upper portion of the separation area 2 is a security portion to be used before the emergency outlet 18 is used. The upper portion of the separation area 2 arranged above the maximum level 16 also has openings 3. During normal use, when the debris is lifted by the screw 9, liquid 4 also flows through the openings 3 arranged in the upper portion. The structural unit of the axle 8 and screw 9 may be designed without an axle in the lower portion as it can be to be seen in FIG. 2. The axle 8 ends approximately at the level of the flange 15 of the charger 12. It is evident that the opening 17 is located completely below the liquid level.

Figure 3:
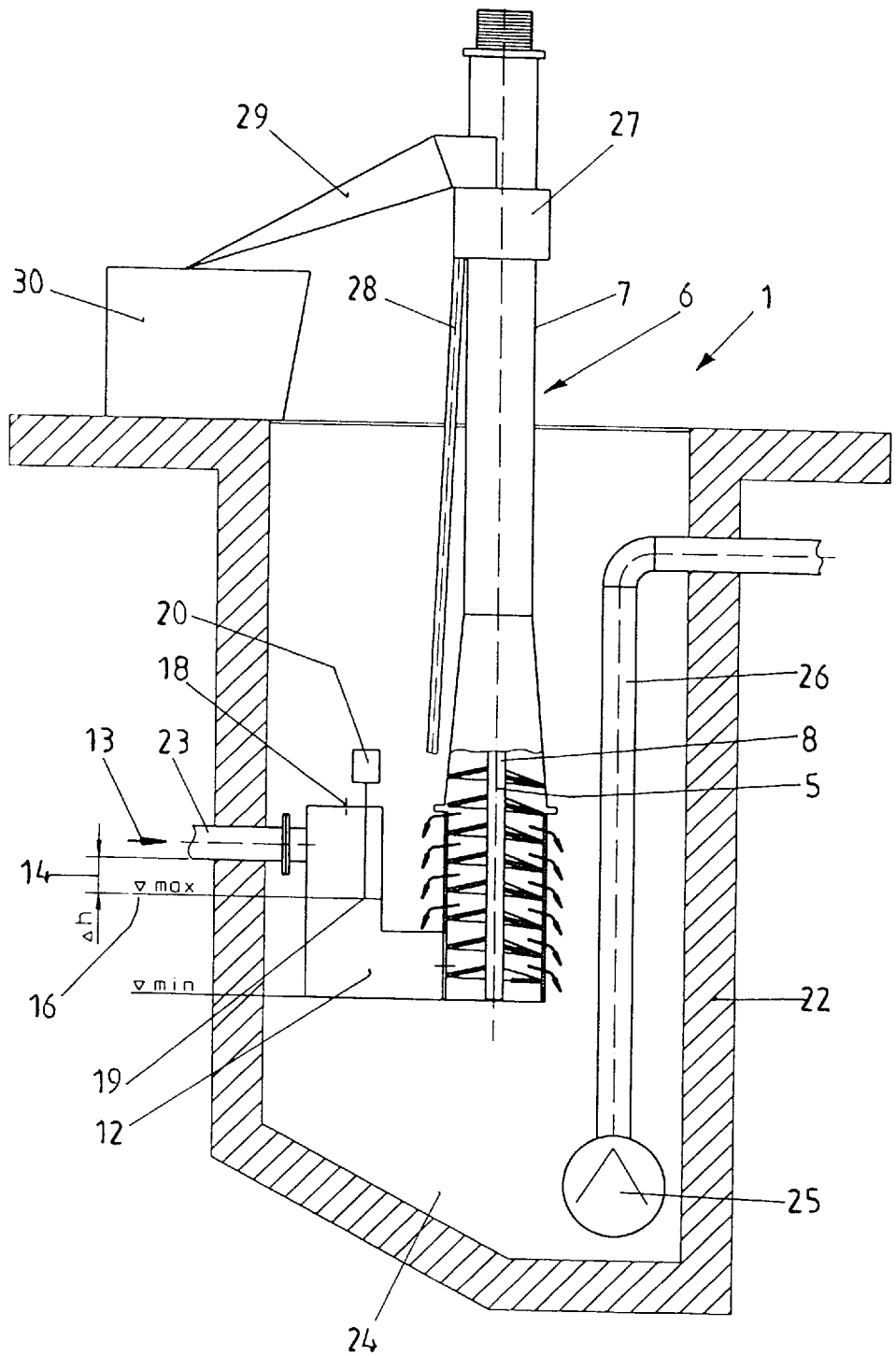
FIG. 3 illustrates a third embodiment of the screening apparatus.

FIG. 3 illustrates the screening apparatus 1 of FIG. 2 being installed in a pit 22. The screening apparatus 1 including the charger 12 is arranged in the pit 22 and connected to an oncoming tube 23. The pit 22 forms a pump sump 24 collecting the liquid 4 flowing through the openings 3 of the separation area 2. The liquid 4 is removed by a pump 25 and a conduit 26. The deposited debris of the separation area 2 is taken off by the screw 9 of the conveyor assembly 6, and conveyed upwardly. The debris is conveyed through a pressing zone 27 having a return conduit 28 also leading liquid in the pump sump 24. The upwardly conveyed debris falls into a container 30 using a chute 29.

The embodiment of the screening apparatus 1 as illustrated in FIG. 4 is similar to the above described embodiments. The maximum level 16 of this embodiment is located above the maximum level of the embodiments illustrated in FIGS. 1 and 2. The minimum level 31 is arranged at the same level as the lower front area of the separation area 2.

The charger 12 includes tube sections and quarter bends. The charger 12 is axially connected to the separation area 2, so that the liquid 4 containing debris enters the interior and flows into the separation area 2 in a uniform manner. The separation area 2 has the configuration of a drum of which 360° of its circumference can be used.

FIG. 5 shows a sectional view of the housing 7 of the conveyor assembly 6. Conveying bars 32 are arranged on the inner surface of the housing 7. The conveying bars 32 work together with the screw 9 of the conveyor assembly 6. This arrangement is shown in FIG. 5 in an exaggerated manner.

FIG. 6 shows a section view of the separation area 2.

FIG. 7 shows a detail reproduction of the separation area 2. The separation area 2 includes two shells 33 and 34 connected by screws. Sticks 35 are provided at the connection points to form "negative" conveyor bars 36, i.e. grooves or recesses in form of clearance zones into which debris can enter and is prevented from rotation. This arrangement improves the upward conveying motion of the debris.

FIG. 8 shows a detail reproduction of one portion of the inner surface 41 of the separation area 2, and of the screw 9. The screw 9 has a brush 37 arranged on the radial outside portion. The brush 37 contacts the inner surface 41 of the separation area 2. Instead of the brush 37, a small stick can be alternatively used. Cleaning elements like these are replaceably arranged on the screw 9 as far as the region of the separation area 2 is concerned.

Figure 9:
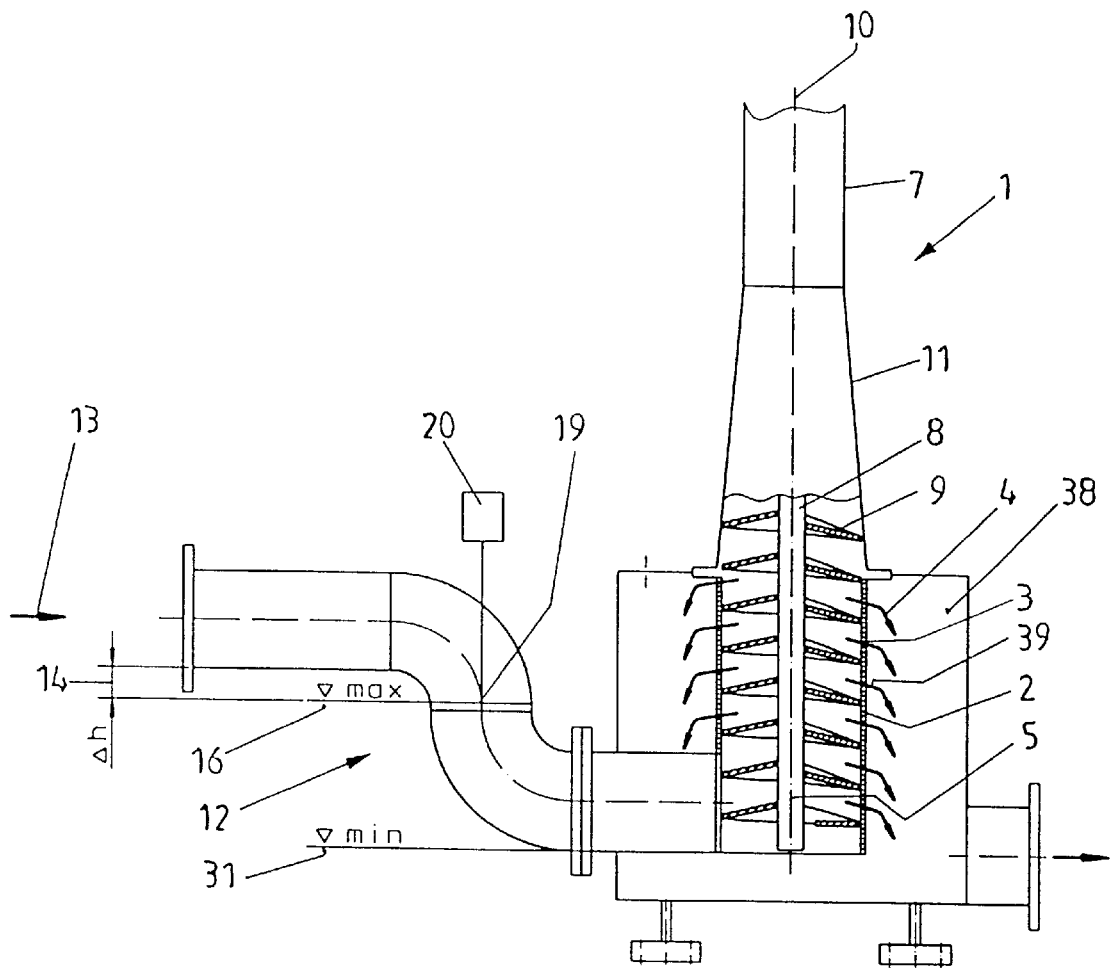
FIG. 9 illustrates a further embodiment of the screening apparatus.

FIG. 9 illustrates an embodiment of the screening apparatus 1 which is used in overground connection. The screening apparatus 1 has small dimension and therefore requires little room. The charger 12 in form of a conduit extends through a container 38 in which the screening apparatus 1 is positioned. The container 38 serves to collect the liquid 4 flowing through the openings 3 of the separation area 2. The charger 12 is radially connected to the separation area 2.

Many variations and modifications may be made to the preferred embodiments of the invention without departing substantially from the spirit and principles of the invention. All such modifications and variations are intended to be included herein within the scope of the present invention, as defined by the following claims.

We claim:

1. A screening apparatus for sewage including liquid and debris and flowing in an oncoming tube, said screening apparatus comprising:

a conveyor assembly having a tube-like housing defining an axis, an axle driven by a motor, and a screw arranged on said axle, said axis being arranged substantially vertically to convey debris in a substantially upward direction;

a separation area of cylindrical shape to deposit the debris, said separation area having an axis, an inner surface, a circumference, and openings located about said circumference, said separation area being arranged with its axis in alignment with said substantially vertically arranged axis of said conveyor assembly, said separation area being connected to said housing of said conveyor assembly, and said separation area including an opening serving as an inlet for the sewage into the interior of said separation area; and a charger being arranged upstream of said opening of said separation area, said charger being connected to said oncoming tube and being designed and arranged to generate a height difference between said oncoming tube and a maximum level of sewage in said charger, and to provide a free outlet of the liquid through said separation area without backing-up of the sewage in the oncoming tube.

2. The screening apparatus of claim 1, wherein said axle and said screw of said conveyor assembly extend completely along said inner chamber of said separation area.

3. The screening apparatus of claim 1, wherein said axle and said screw of said conveyor assembly extend partly along said inner chamber of said separation area.

4. The screening apparatus of claim 1, wherein said screw includes a brush located on its radial outside.

5. The screening apparatus of claim 1, wherein said screw includes a stick located on its radial outside.

6. The screening apparatus of claim 1, wherein said charger is radially connected to said separation area.

7. The screening apparatus of claim 1, wherein said charger is axially connected to said separation area.

8. The screening apparatus of claim 1, wherein said charger includes an emergency outlet connected to the atmosphere.

9. The screening apparatus of claim 1, further comprising a conical housing arranged between said separation area and said housing of said conveyor assembly.

10. The screening apparatus of claim 1, wherein said screw of said conveyor assembly is radially arranged in downwardly inclined relation with respect to said axle.

11. The screening apparatus of claim 1, wherein said separation area includes two shells and conveyor bars arranged between said two shells and spaced apart from said inner surface of said separation area.

12. The screening apparatus of claim 1, wherein said housing of said conveyor assembly includes conveying bars.

13. The screening apparatus of claim 1, wherein said axle of said conveyor assembly is a tube.

14. The screening apparatus of claim 1, further comprising a container substantially surrounding said screening apparatus and serving to collect the liquid penetrating through said openings of said separation area.

15. A screening apparatus for screening sewage that includes liquid and debris and flowing in an oncoming tube, said apparatus comprising:

a generally cylindrical separation chamber having an axis, an inner surface, a circumference, and openings located about said circumference, said separation chamber being substantially vertically oriented and being formed with an inlet;

a conveyor rotatably disposed in said separation chamber, said conveyor having an axle extending at least partially along said axis of said separation chamber and a screw, said screw attached to said axle, rotation of said conveyor causing debris in said separation chamber to be conveyed in a generally upward direction;

a drive for selectively rotating said conveyor; and a charger coupled between said inlet and the oncoming tube, said charger be configured to establish a height difference between the oncoming tube and a maximum level of sewage in said charger.

16. An apparatus for screening sewage as claimed in claim 15 and wherein said axle has a lower end and said screw extends beyond said lower end of said axle.

* * * * *